(12) United States Patent
Culot

(10) Patent No.: US 10,760,328 B2
(45) Date of Patent: Sep. 1, 2020

(54) STRUCTURAL GLAZING

(71) Applicant: DOW SILICONES CORPORATION, Midland, MI (US)

(72) Inventor: Dominique Culot, Seneffe (BE)

(73) Assignee: DOW SILICONES CORPORATION, Midland, MI (US)

(*) Notice: Subject to any disclaimer, the term of this patent is extended or adjusted under 35 U.S.C. 154(b) by 0 days.

(21) Appl. No.: 16/333,353

(22) PCT Filed: Sep. 15, 2017

(86) PCT No.: PCT/EP2017/073344
§ 371 (c)(1),
(2) Date: Mar. 14, 2019

(87) PCT Pub. No.: WO2018/050855
PCT Pub. Date: Mar. 22, 2018

(65) Prior Publication Data
US 2019/0211614 A1    Jul. 11, 2019

(30) Foreign Application Priority Data

Sep. 16, 2016 (GB) .................................. 1615907.1
Sep. 17, 2016 (GB) .................................. 1615906.3

(51) Int. Cl.
*E06B 3/663* (2006.01)
*C09J 183/04* (2006.01)
(Continued)

(52) U.S. Cl.
CPC .......... *E06B 3/66333* (2013.01); *C08L 83/04* (2013.01); *C09J 183/04* (2013.01);
(Continued)

(58) Field of Classification Search
CPC ....... E06B 3/66333; E06B 2003/66338; E06B 2607/00; E06B 1/12; E06B 1/36;
(Continued)

(56) References Cited

U.S. PATENT DOCUMENTS 3,094,446 A * 6/1963 Burdick .................. C08L 83/04
                                                              428/428
3,159,601 A   12/1964 Ashby
(Continued)

FOREIGN PATENT DOCUMENTS

CN   104968749 A   10/2015
EP      0347895 B1  11/1993
(Continued)

OTHER PUBLICATIONS

Translation of cited reference EP1564361 (Year: 2005).*
(Continued)

*Primary Examiner* — Donald J Loney
(74) *Attorney, Agent, or Firm* — Warner Norcross + Judd LLP

(57) ABSTRACT

A structural glazing assembly is provided. The structural glazing assembly comprises a frame and a transparent panel, optionally spaced apart by a transparent spacer material. The frame and panel being adhered to each other by a layer of a transparent silicone elastomer located there between. In general, the silicone elastomer is the cured elastomeric product of a moisture-curable hot melt silicone adhesive composition.

13 Claims, 1 Drawing Sheet

(51) Int. Cl.
*C08L 83/04* (2006.01)
*C08G 77/12* (2006.01)
*C08G 77/20* (2006.01)
*C08G 77/18* (2006.01)
*B32B 17/10* (2006.01)
*E06B 1/12* (2006.01)
*E06B 1/36* (2006.01)
*B32B 7/12* (2006.01)
*B32B 7/04* (2019.01)
*B32B 17/06* (2006.01)
*E06B 3/12* (2006.01)
*E06B 3/24* (2006.01)
*C08K 5/5419* (2006.01)

(52) U.S. Cl.
CPC . *B32B 7/04* (2013.01); *B32B 7/12* (2013.01); *B32B 17/061* (2013.01); *B32B 17/10798* (2013.01); *C08G 77/12* (2013.01); *C08G 77/18* (2013.01); *C08G 77/20* (2013.01); *C08K 5/5419* (2013.01); *E06B 1/12* (2013.01); *E06B 1/36* (2013.01); *E06B 3/12* (2013.01); *E06B 3/24* (2013.01); *E06B 2003/66338* (2013.01)

(58) Field of Classification Search
CPC ..... E06B 3/12; E06B 3/24; B32B 7/04; B32B 7/12; B32B 17/061; B32B 17/10798
See application file for complete search history.

(56) References Cited

U.S. PATENT DOCUMENTS

| | | | |
|---|---|---|---|
| 3,220,972 A | 11/1965 | Lamoreaux | |
| 3,296,291 A | 1/1967 | Chalk et al. | |
| 3,419,593 A | 12/1968 | Willing | |
| 3,516,946 A | 6/1970 | Modic | |
| 3,814,730 A | 6/1974 | Karstedt | |
| 3,989,668 A | 11/1976 | Lee et al. | |
| 4,784,879 A | 11/1988 | Lee et al. | |
| 5,036,117 A | 7/1991 | Chung et al. | |
| 5,175,325 A | 12/1992 | Brown et al. | |
| 6,238,755 B1 | 5/2001 | Harvey et al. | |
| 2015/0376481 A1 | 12/2015 | Larson et al. | |
| 2016/0120336 A1 | 5/2016 | Schneider et al. | |
| 2017/0016271 A1 | 1/2017 | Boucher et al. | |
| 2017/0362882 A1 | 12/2017 | Boucher et al. | |

FOREIGN PATENT DOCUMENTS

| | | | | |
|---|---|---|---|---|
| EP | 1564361 A2 | * | 8/2005 | ............... E06B 3/64 |
| FR | 2650609 A1 | | 2/1991 | |
| GB | 2241013 A | | 8/1991 | |
| GB | 2259925 A | | 3/1993 | |
| WO | 2014124389 A1 | | 8/2014 | |
| WO | 2015132071 A1 | | 9/2015 | |
| WO | 2016091954 A1 | | 6/2016 | |

OTHER PUBLICATIONS

International Search Report for WO Application No. PCT/EP2017/073344 dated Nov. 14, 2017, 3 pages.
International Search Report for International Application No. PCT/EP2017/073353 dated Nov. 14, 2017, 3 pages.
Machine assisted translation of FR2650609A1 obtained from https://worldwide.espacenet.com on Mar. 9, 2019, 19 pages.

* cited by examiner

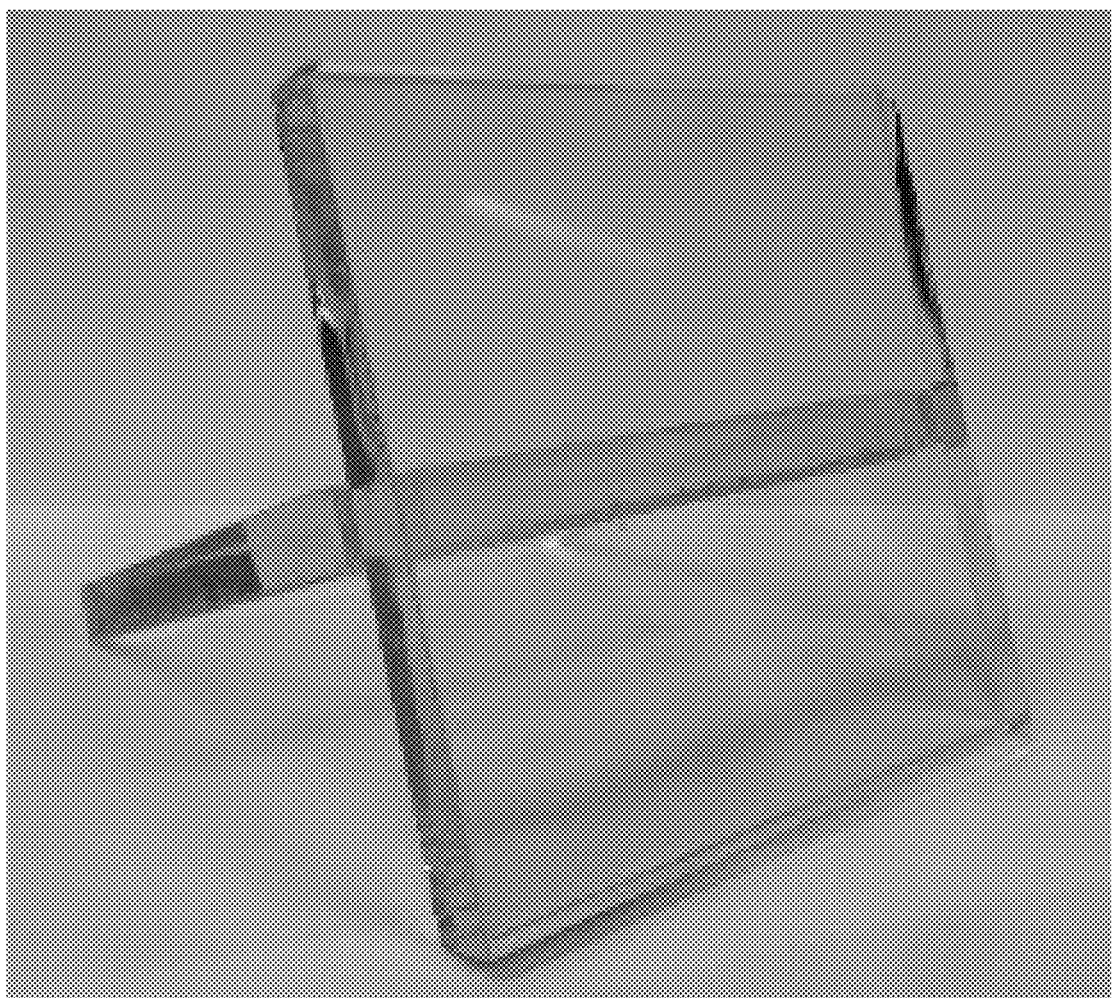

STRUCTURAL GLAZING

CROSS-REFERENCE TO RELATED APPLICATIONS

This application is the National Stage of International Application No. PCT/EP2017/073344 filed on 15 Sep. 2017, which claims priority to and all advantages of Great Britain Patent Appl. No. 1615907.1 filed on 16 Sep. 2016 and Great Britain Patent Appl. No. 1615906.3 filed on 17 Sep. 2016, the contents of which is hereby incorporated by reference.

This invention is concerned with improvements in or relating to structural glazing. A curtain wall façade is an outer covering of a building designed to be non-structural i.e. it does not support the building as a whole, it merely supports its own weight. Curtain wall facades are designed to transfer incident horizontal wind loads (which can be extremely high based on the design, height, and location of the building) to the main building structure through connections at floors or columns of the building and are additionally designed to resist air and water infiltration.

Curtain-wall façade assemblies are typically designed using lightweight support/frame materials, to reduce construction costs and minimise the weight of the facade. Hence, extruded aluminum members or the like are often used to form light weight frames/supports made e.g. from mullions and transoms (mullions are vertical articles designed to form a division between façade units in order to provide structural support to the glazing of the window and transoms are similar horizontal elements). A variety of panels or infills may be inserted and fixed in place in/on said frames/supports. The panels or infills may be, for the sake of example, glass, stone veneer, metal, louvres, shadow boxes, and operable windows or vents.

The glass panels or infills (hereafter referred to as panels) may contain a single pane of glass, laminated glass, double glazed insulating glass units (IGUs) or triple glazed IGUs. The frame/support may contain horizontal aluminium transoms and/or vertical aluminum mullions. A typical panel may consist of the following components: a facing material (such as, aluminum, stone, glass masonry, etc.), insulation, and an air and vapor barrier and may use extruded silicone gaskets, or a wet sealed silicone structural sealant depending on the means for adhering the panes or infills to the frame/support.

There a variety of types of structural glazing assemblies. A two-sided glazing system is typically one in which a glass panel (i.e. an insulated glazing unit) is conventionally glazed at opposite sides, i.e., mechanically retained with gaskets, but utilizes structural silicone to bond the glass panel to the perimeter framing/support on the remaining two sides (typically the mullions). The mechanically retained edges generally support the dead load (the load due to mass of the components of the glazing system) of the glass panel. The live load of the glass panel (the weight imposed by use and occupancy of the building) is carried on the two edges with a structural silicone elastomer.

A four-sided glazing assembly is typically one in which a structural silicone sealant is used to bond a glass panel to the frame/support on all sides. As such, the resulting structural silicone elastomer acts as a continuous flexible anchor between the glass panel and the frame/support. Dead loads are supported either mechanically by a horizontal fin and/or by the structural silicone elastomer alone, depending on the design of the glazing system. Four-sided glazing assemblies are typically sealed continuously around the glass panel perimeter, blocking air and water from entering the interior of the building. Typically, in either glazing system, the structural silicone has a substantially rectangular cross-section due to the shape of the glass panel and shape of the frame-members behind the glass panel.

"Structural bite" or "bite" is the minimum width or contact surface of a structural silicone elastomer on both the glass panel and the frame/support. Typically, the building design wind load, glass panel dimensions, impact loads, dead load, and thermal dilation stresses must be considered in determination of the bite dimension. A typical bite to thickness ratio for a rectangular cross-section of structural adhesive is 1:1 to 3:1, with minimum bites of 6 mm and minimum thicknesses of 6 mm. As such, the bite is typically larger than the thickness of the structural silicone elastomer. Thickness is considered the distance from the glass panel to the frame/support, i.e., the shortest side of the rectangular cross-section. Proper thickness facilitates installation of the structural silicone elastomer and allows reduced adhesive stress from differential thermal movement between a glass panel and the frame/support.

The bite requirement is directly proportional to the wind load on the building and the dimensions of the glass panel. Two of the controlling variables which affect the bite requirement are the maximum short span dimension of the glass panel and the design wind load that the glazing system must be designed to accommodate. Typically, the higher the wind load and the larger the short span dimension of the glass panel is, the greater the amount of bite required. Spacers may be utilised to ensure that the right amount and thickness of sealant is applied.

Curtain walls can be classified by their method of fabrication and installation into the following general categories: stick systems and unitized (also known as modular) systems. In the stick system, the curtain wall frame/support (mullions) and glass or opaque panels are installed and connected together piece by piece. In the unitized system, the curtain wall is composed of large units that are assembled and glazed in the factory, shipped to the site and erected on the building. Mullions of the assemblies mate together with the adjoining assemblies. The assemblies are generally constructed one story tall and one assembly wide but may incorporate multiple assemblies. Typical units are five to six feet wide.

As such, there remains an opportunity to provide assemblies having improved properties for example the provision of a transparent bonding system to bond panels, particularly glass panels and maximise the ingress of natural lighting into the building through the façade, resulting in improved natural lighting within the building with improved lighting and aesthetics. It is an object herein to provide structural glazing with transparent bonding between a glass infill and a frame or support.

BRIEF DESCRIPTION OF THE DRAWING(S)

FIG. 1 is a photograph illustrating the transparent nature of the hot melt adhesive described herein.

The present invention provides in one of its aspects a structural glazing assembly comprising a frame/support and a transparent panel, optionally spaced apart by a transparent spacer material, said frame/support and said panel being adhered to each other by a layer of a transparent silicone elastomer located there between.

When present, the spacer may be adhered directly to the surface of the glass. The spacer may be selected from any suitable transparent material. Examples include, glass, clear butyl, a hydrosilylation or peroxide cured silicone rubber elastomer, cured polymethyl methacrylate (PMMA), and extruded transparent polyisobutylene (PIB) and the like. The spacer may have any suitable cross-sectional geometry, it be a pre-cured strip of material adhered to the glass surface via a primary sealant, or may be self-adhesive to the glass surface or may be a pre-shaped solid e.g. of glass for example a pre-formed frame, providing in each case that the spacer is transparent. The spacer may be either self-adhesive to the substrate, e.g. adhered directly to the surface of the glass panes of an insulated glazing unit or may be adhered to the glass using a transparent sealant.

In another aspect of the invention there is provided a method of preparing a structural glazing assembly comprising in any appropriate order:
(i) providing a frame/support having a first major surface,
(ii) applying a transparent silicone adhesive composition onto the first major surface of the metal frame,
(iii) positioning a glass panel on the silicone adhesive composition,
(iv) curing the sealant to bond the glass panel to the first major surface of the frame/support.

Optionally a transparent spacer may be utilised to separate the first major surface of the metal frame and the glass panel. When such a spacer is present, there is provided a method of preparing a structural glazing unit comprising, in no particular order:
(i) providing a metal frame having a first major surface,
(ii) applying the transparent spacer onto the said first major surface of the metal frame,
(iii) positioning a glass panel on the transparent spacer,
(iv) filling a cavity with a transparent silicone adhesive composition, said cavity defined by the first major surface of the metal frame, the transparent spacer and the glass panel,
(v) curing the sealant to bond the glass panel to the first major surface of the metal frame.

The frame/support is generally made from a metallic material, for example, aluminium, extruded aluminium and/or aluminium alloy(s). The frame/support can also be made of glass, for instance when the curtain wall contains glass fins structures'

The transparent spacer, when present, may be made of any suitable transparent material. Examples include pre-formed silicone elastomer materials made from hydrosilylation cured silicone rubber, glass, reinforced glass, polymethyl methacrylate (PMMA) and polycarbonate.

The silicone elastomer as hereinbefore described is preferably the cured elastomeric product of a moisture-curable hot melt silicone adhesive composition. The moisture-curable hot melt silicone adhesive composition may comprise:
(A) a reactive resin comprising the reaction product of a reaction of:
  (i) an alkenyl-functional siloxane resin comprising $R_3SiO_{1/2}$ units and $SiO_{4/2}$ units, wherein each R is independently a monovalent hydrocarbon radical having 1 to 6 carbon atoms with the proviso that at least one R is an alkenyl radical, wherein the molar ratio of the $R_3SiO_{1/2}$ units to $SiO_{4/2}$ units has a value of from 0.5/1 to 1.5/1,
  (ii) an alkoxysilane-functional organosiloxane compound having at least one silicon-bonded hydrogen atom, and optionally
  (iii) an endcapper and optionally
  (iv) an alkenyltrialkoxysilane, in the presence of
  (v) a hydrosilylation catalyst,
(B) a reactive polymer comprising the reaction product of a reaction of:
  (vi) an alkoxysilane-functional organosiloxane compound having at least one silicon-bonded hydrogen atom; and
  (vii) a polyorganosiloxane having an average, per molecule, of at least 2 aliphatically unsaturated organic groups, optionally
  (viii) an alkenyltrialkoxysilane, in the presence of
  (ix) a hydrosilylation catalyst;
(C) a moisture cure catalyst; and
(D) a crosslinker.

As noted above, the reactive resin (A) is formed as the reaction product of a reaction of (i) an alkenyl-functional siloxane resin, (ii) an alkoxysilane-functional organosiloxane compound having at least one silicon-bonded hydrogen atom, and optionally (iii) an endcapper and (iv) vinyltrimethoxysilane in the presence of (iv) a hydrosilylation catalyst.

In certain embodiments, the reactive resin (A) has a weight average molecular weight $M_w$ ranging from 12,000 to 30,000 g/mole (Daltons), alternatively from 17,000 and 22,000 g/mole. In addition, it is preferable that the hydroxyl content of the reactive resin (A) is less than 1 weight percent of the total weight of reactive resin (A). The term "hydroxyl content", as defined herein, refers to the weight percent of hydroxyl groups in the particular molecule in which they are included, and here defined as the total weight percent of hydroxyl groups in the reactive resin (A) (i.e., the weight percent of OH groups in the reactive resin (A)).

Component (i) of the reactive resin (A) is an alkenyl-functional siloxane resin comprising $R_3SiO_{1/2}$ units and $SiO_{4/2}$ units (i.e., M and Q Units). At least one third, and more preferably substantially all R radicals, are methyl radicals, with the proviso that at least one R radical is an alkenyl radical, and further with the proviso that the resin (i) ranges from 0.6 to 2.2 weight percent, alternatively from 1.0 to 2.0 weight percent, alkenyl-functionality, based on the total weight of the resin (i). Stated differently, the alkenyl radical content of the resin (i) ranges from 0.6 to 2.2 weight percent, alternatively from 1.0 to 2.02 weight percent, of the total weight of the resin (i). Also, the component (i) has a silanol content of less than 1.0 weight percent, alternatively 0.3 to 0.8 weight percent, based on the total weight of the reactive resin (A). Examples of preferred $R_3SiO_{1/2}$ units having methyl radicals include $Me_3SiO_{1/2}$ units and $PhMe_2SiO_{1/2}$ units, wherein Me is methyl and Ph is phenyl. The term "silanol content", as defined herein, refers to the weight percent of silicon-hydroxy groups in the particular molecule in which they are included, and here defined as the total weight percent of silicon-hydroxy groups in the component (i) (i.e., the weight percent of Si—OH groups in the resin).

For the purposes of the present invention, the molar ratio of $R_3SiO_{1/2}$ units to $SiO_{4/2}$ units in resin (i) ranges from 0.5:1 to 1.5:1. Alternatively, the molar ratio of the total M units to total Q units of the resin (i) is between 0.6:1 and 1.0:1. The above M/Q molar ratios can be easily obtained by $^{29}Si$ nuclear magnetic resonance (NMR) spectroscopy. In addition, the resin (i) has a weight average molecular weight Mw ranging from 12,000 to 30,000 g/mole (Daltons), alternatively from 17,000 and 22,000 g/mole.

In certain embodiments, the resin (i) comprises from 82 to 99 weight percent, alternatively from 85 to 98 weight percent, of the total weight of the reactive resin (A).

Component (ii) of component (A) is an alkoxysilane-functional organosiloxane compound having at least one silicon-bonded hydrogen atom at a molecular terminal. In certain embodiments, the component (ii) is of the general formula $HSi(R^2)_2OSi(R^2)_2CH_2CH_2Si\,R^2_z(OR^2)_{3-z}$, wherein $R^2$ is a monovalent hydrocarbon having 1 to 6 carbon atoms and wherein the subscript z is 0 or 1. Even more preferably, the alkoxysilane-functional organosiloxane compound having at least one silicon-bonded hydrogen atom at a molecular terminal (ii) is of the general formula $HSi(Me)_2OSi(Me)_2CH_2CH_2Si(OMe)_3$, wherein Me is methyl.

In certain embodiments, the compound (ii) comprises from 1 to 8 weight percent, alternatively from 2 to 7 weight percent, of the total weight of the reactive resin (A).

In certain embodiments, the reactive resin (A) includes, as part of its reaction product, an endcapper (iii). The endcapper (iii) may be a polydiorganosiloxane having one hydrogen atom per molecule. An exemplary endcapper may have the formula (I), formula (II), or a combination thereof. Formula (I) is $R^3{}_3Si$—$(R^3{}_2SiO)_s$—$SiR^3{}_2H$. Each $R^3$ is independently a monovalent hydrocarbon group exemplified by alkyl such as methyl, ethyl, propyl, butyl, pentyl, and hexyl; and aryl such as phenyl, tolyl, xylyl and benzyl; and subscript s has a value ranging from 0 to 10, alternatively 1 to 10, and alternatively 1. Formula (II) is $R^4{}_3Si$—$(R^4{}_2SiO)_t$—$(HR^4SiO)$—$SiR^4{}_3$. In this formula, each $R^4$ is independently a monovalent hydrocarbon group exemplified by alkyl such as methyl, ethyl, propyl, butyl, pentyl, and hexyl; and aryl such as phenyl, tolyl, xylyl and benzyl. Subscript t has a value ranging from 0 to 10, alternatively 0.

In certain embodiments, the endcapper (iii) comprises up to 9 weight percent, alternatively up to 8 weight percent, of the total weight of the reactive resin (A).

In certain embodiments, the reactive resin (A) includes, as part of its reaction product, (iv) a alkenyltrialkoxysilane according to the formula $AlkSi(OR^5)_3$, wherein each $R^5$ is independently a monovalent hydrocarbon having 1 to 6 carbon atoms, wherein Alk represents an alkenyl group having 2 to 6 carbon atoms, and wherein the alkenyl group is at the molecular terminal. Exemplary alkenyltrialkoxysilanes include vinyltrimethoxysilane, allyltrimethoxysilane and hexenyltrimethoxysilane.

In certain embodiments, the alkenyltrialkoxysilane (iv) comprises up to 1 weight percent, alternatively from 0.05 to 0.3 weight percent, of the total weight of the reactive resin (A).

The weight percent of silicon bonded hydrogen atoms in the components/unsaturated organic groups capable of undergoing hydrosilylation in the components (commonly referred to as $SiH_{tot}/Vi_{tot}$ ratio) of the reactive resin (A) may range from 0.1 to 1.0. In this ratio, $SiH_{tot}$ refers to the total amount of silicon bonded hydrogen atoms in component (ii) in combination with the amount of silicon bonded hydrogen atoms in component (iii), if present. $Vi_{tot}$ refers to the total amount of aliphatically unsaturated organic groups in component (i) in combination with the amount of aliphatically unsaturated organic groups in component (iv), if present.

Component (v) of the reactive resin (A) is a hydrosilylation catalyst which accelerates the reaction of components (i)-(ii), as well as optional components (iii) and (iv), if present. Component (v) may be added in an amount sufficient to promote the reaction of components (i)-(ii), as well as optional components (iii) and (iv), if present, and this amount may be, for example, sufficient to provide 0.1 parts per million (ppm) to 1000 ppm of platinum group metal, alternatively 1 ppm to 500 ppm, alternatively 2 ppm to 200, alternatively 5 ppm to 20 ppm, based on the combined weight of components (i)-(ii) and optionally (iii) and (iv) used in the process. Alternatively, component (v) from 0.05 to 0.3 weight percent, alternatively from 0.05 to 0.15 weight percent, of the total weight of the reactive resin (A).

Suitable hydrosilylation catalysts are known in the art and commercially available.

Component (v) may comprise a platinum group metal selected from platinum (Pt), rhodium, ruthenium, palladium, osmium or iridium metal or organometallic compound thereof, or a combination thereof. Component (v) is exemplified by compounds such as chloroplatinic acid, chloroplatinic acid hexahydrate, platinum dichloride, and complexes of the compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum. Alternatively, the catalyst may comprise 1,3-diethenyl-1,1,3,3-tetramethyldisiloxane complex with platinum. When the catalyst is a platinum complex with a low molecular weight organopolysiloxane, the amount of catalyst may range from 0.04% to 0.4% based on the combined weight of the components used in the process.

Suitable hydrosilylation catalysts for component) are described in, for example, U.S. Pat. Nos. 3,159,601; 3,220, 972; 3,296,291; 3,419,593; 3,516,946; 3,814,730; 3,989, 668; 4,784,879; 5,036,117; and 5,175,325 and EP 0 347 895 B.

The moisture cure catalyst (C), which is used to accelerate the cure of the instant compositions upon exposure to moisture, may be selected from those compounds known in the art to promote the hydrolysis and subsequent condensation of hydrolyzable groups, in particular alkoxy groups. Suitable curing catalysts include, but are not limited to, metal salts of carboxylic acids, such as dibutyltin dilaurate and dibutyltin diacetate, stannous octanoate, ferrous octanoate, zinc naphthenate, zinc octanoate, lead 2-ethylhexanoate; organotitanium compounds such as tetrabutyl titanate and 2,5-di-isopropoxy-bis(ethylacetate)titanium; and partially chelated derivatives of these salts with chelating agents such as acetoacetic acid esters and beta-diketones.

A sufficient quantity of moisture cure catalyst (C) is added to accelerate the cure of the hot melt adhesive composition. This amount can readily be determined by the skilled artisan through routine experimentation and is typically about 0.01 to 3 weight percent, alternatively from 0.1 to 1.0 weight percent, based on the combined weight of the resin (A) and polymer (B) solids.

The crosslinker (D) of the present invention is typically a silane represented by monomers of the formula $R^{10}{}_{4-y}SiX_y$, and oligomeric reaction products thereof; wherein $R^{10}$ is selected from the group consisting of hydrocarbon radicals and substituted hydrocarbon radicals having 1 to 6 carbon atoms. X in the above formula is a hydrolyzable group, preferably selected from alkoxy radicals having 1 to 4 carbon atoms, ketoxime radicals, aminoxy radicals, acetamido, N-methylacetamido or acetoxy radicals and y is 2 to 4, preferably 3 to 4. The ketoxime groups are of the general formula —$ONC(R^{11})_2$, in which each $R^{11}$ independently represents an alkyl radical having 1 to 6 carbon atoms or a phenyl radical.

Specific examples of silanes include, but are not limited to, methyltriethoxysilane, ethyltrimethoxysilane, propyltrimethoxysilane, tetramethoxysilane tetraethoxysilane, phenyltrimethoxysilane, isobutyltrimethoxysilane, and 3-mercaptopropyltrimethoxysilane, (1,6-Bis(trimethoxysilyl)hexane)glycidoxypropyltrimethoxysilane, aminoethylaminopropyltrimethoxysilane, methyltriacetoxysilane, ethyltriacetoxysilane, tetra(methylethyl ketoximo) silane, methyl-tris(methylethylketoximo)silane and vinyl-tris(methylethylketoximo)silane, and others.

Typically the crosslinker (D) is added in amounts ranging from 0.01 to 10 weight percent, alternatively from 0.3 to 5 weight percent, based on the weight of (A) and (B). The silane may be added for several purposes including, but not limited to, to provide stability to the compositions as a moisture scavenger, to aid with network formation, and to act as an adhesion promoter.

Hot melt adhesive compositions as described herein can be obtained when the weight ratio of reactive resin (A) to reactive polymer (B) ranges from 40:60 to 80:20, alternatively from 50:50 to 70:30, alternatively from 55:45 to 65:35, based on solids. The precise ratio needed to form these systems can be ascertained for a given resin and polymer combination by routine experimentation based on the instant disclosure. When this ratio is below about 40:60, the compositions are fluids which do not exhibit non-slump character; when this ratio is above about 80:20, the compositions exhibit an increased tendency to produce embrittled materials upon cure (i.e., they do not form elastomers).

By "non-slump" it is meant that the material appears to be a solid such that, when a 60 cc jar is filled to about one third capacity with the material and tipped on its side at room temperature (i.e., about 25° C.), essentially no flow is observed within a 20 minute period. This corresponds to a minimum room temperature dynamic viscosity in the approximate range $2 \times 10^7$ to $8 \times 10^7$ mPa s when measured at 1 radian/sec. The hot melt compositions of the invention flow at elevated temperatures and can readily be extruded from a conventional hot melt gun (e.g., the dynamic viscosity is of the order $10^4$ mPa s at 200° C.).

In addition to components (A)-(D) provided above, in general, small amounts of additional components may be added to the hot melt adhesive composition as hereinbefore described provided the resulting elastomer, when cured, is transparent. For example, one or more fillers (E), corrosion inhibitors (F), thermal stabilizers (G), rheological aids (H), and others, may be added as long as they do not materially alter the requirements stipulated herein.

The filler (E) may be added in an amount up to 60 weight percent, alternatively 30 to 55 weight percent, of the total weight of the hot melt adhesive composition. Fillers (E) useful in the instant invention may be exemplified by, but not limited to, inorganic materials such as pyrogenic silica, precipitated silica and diatomaceous silica, ground quartz, aluminum silicates, mixed aluminum and magnesium silicates, zirconium silicate, mica powder, calcium carbonate, glass powder and fibres, titanium oxides of the pyrogenic oxide and rutile type, barium zirconate, barium sulphate, barium metaborate, boron nitride, lithopone, the oxides of iron, zinc, chrome, zirconium, and magnesium, the different forms of alumina (hydrated or anhydrous), and calcined clay and organic materials such as the phthalocyaniines, synthetic fibres and synthetic polymers (polytetrafluoroethylene, polyethylene, polypropylene, polystyrene and polyvinyl chloride). The filler (E) may be of a single type or mixtures of several types.

Component (F) is a corrosion inhibitor. Examples of suitable corrosion inhibitors include benzotriazole, mercaptabenzotriazole, mercaptobenzothiazole, and commercially available corrosion inhibitors such as 2,5-dimercapto-1,3,4-thiadiazole derivative (CUVAN® 826) and alkylthiadiazole (CUVAN® 484) from R. T. Vanderbilt. The amount of component (F) may range from 0.05% to 0.5% based on the weight of the hot melt adhesive composition.

Component (G) is a thermal stabilizer. Suitable thermal stabilizers that may be utilized include Ce, Cu, Zr, Mg, Fe and Zn metal salts. The amount of component (G) may range from 0.001% to 1.0% based on the weight of the hot melt adhesive composition. Component (H) is a rheological aid that, in certain embodiments, may function to modify the melt viscosity and/or to improve the green strength for the hot melt compositions. Suitable rheological aids include, but are not limited to, plasticizers, nonreactive waxes, reactive waxes, tackifier resins, and combinations thereof.

Suitable examples of component (H) include but are not restricted to one or more of the following, and their derivatives: polyolefins such as polyethylenes, polypropylenes, polybutylenes, and polyisobutylenes; polyvinyl acetate; hydrocarbon resins, hydrogenated aromaotic pure monomer hydrocarbon resins, including aromatic pure styrene hydrocarbon resins; asphalts; bitumens; paraffins; crude rubbers; fluorinated rubbers; fluorocarbons; polystyrenes; cellulosic resins; acrylic resins; styrene butadiene resins; polyterpenes; ethylene propylene diene monomer (EPDM); and mixtures and/or derivatives thereof.

Suitable commercial materials that may be utilized include Benzoflex 352, available from Eastman Chemical Co. of Kingsport, Tenn.; Vorasil 602 or 604, each available from Dow Chemical of Midland, Mich.; Licocene® PE SI 3361 TP and Licowax® E, each available from Clariant of Charlotte, N.C.; and Escorez™ 5320, a tackifying resin commercially available from ExxonMobil of Houston, Tex. In certain other embodiments, these commercially available materials may be used alone or in combination with Oppanol® B12, available from BASF Corporation of Florham Park, N.J.

The amount of component (H) may range from 0.1 to 20%, alternatively 0.5 to 10%, alternatively 1 to 2%, based on the weight of the hot melt adhesive composition. The Hot Melt compositions of the instant invention can be prepared in several ways.

The moisture curable hot melt composition as hereinbefore described may be prepared in one exemplary method, as follows:

(i) The reactive resin (A) and reactive polymer (B) are premade as described above and then premixed in a high shear mixer via a batch or continuous process and fed into an extruder, such as a twin-screw extruder, for removal of solvents via devolatization. In certain embodiments, the extruded mixture is heated to about 140° C.-180° C. during this devolatization;

(ii) The extruded and devolatized mixture of the reactive resin (A) and reactive polymer (B) is then cooled to less than 95° C., wherein a mixture of the moisture cure catalyst (C) and the crosslinker (D) are added via a batch or continuous process. In addition, any other combination of optional components (E)-(I) may be also be added via a batch or continuous process.

(iii) The resultant mixture is then extruded to form the hot melt adhesive, which may be stored for subsequent use or available for immediate application to a substrate. In certain embodiments, for example, the hot melt adhesive may be stored and sealed in a 12 oz aluminum Semco tubes (available from PPG Industries, Semco® Packaging and Application Systems, Pittsburgh, Pa. 15272 USA).

In another exemplary method moisture curable hot melt composition may be prepared as follows:

(i) The reactive polymer (B) is premade as described above and premixed in a high shear mixer via a batch or continuous process with the alkenyl-functional siloxane resin (component (i) of the reactive resin (A)). To this mixture is added components (ii), (iii), (v) and optional component (iv) (i.e., the remainder of the components of the reactive resin (A)).

(ii) The resultant mixture is fed into an extruder, such as a twin-screw extruder, for removal of solvents via devolatilization. In certain embodiments, the extruded mixture is heated to about 140° C.-180° C. during this devolatization.

(iii) The extruded and devolatized mixture is then cooled to less than 95° C., wherein a mixture of the moisture cure catalyst (C) and the crosslinker (D) are added via a batch or continuous process. In addition, any other combination of optional components (E)-(H) may be also be added via a batch or continuous process provided the resulting elastomeric material upon cure is transparent.

(iv) The resultant mixture is then extruded to form the hot melt adhesive, which may be stored for subsequent use or available for immediate application to a substrate. In certain embodiments, for example, the hot melt adhesive may be stored and sealed in a 12 oz aluminum Semco tubes (available from PPG Industries, Semco® Packaging and Application Systems, Pittsburgh, Pa. 15272 USA).

The hot melt adhesive compositions as hereinbefore described may be used to adhere transparent glass panels to the structural glazing supports/frames by any suitable method employed for dispensing organic hot melt formulations. The common factor in these methods is that the composition is heated to a temperature sufficient to induce flow before application. Upon cooling to ambient conditions, the compositions of the present invention are tacky, non-slump adhesive compositions which may be used to bond the glass panes to one another. Alternatively, the bonding can take place while the adhesive is still hot, but the latter will not, of course, support much stress under these conditions. After the desired components are bonded with the hot melt adhesives, the combination is exposed to ambient air so as to cure the hot melt adhesives to an essentially non-tacky elastomer. Essentially tack-free herein indicates that the surface feels dry or nearly dry to the touch. The time required for completion of this cure process ranges from about a day to more than a month, depending upon the catalyst type, catalyst level, temperature and humidity, inter alia. As a result of this cure, the adhesive strength of the instant compositions is greatly augmented.

The moisture-curable hot melt silicone adhesive compositions show improved creep resistance due to increased reactivity between the resin (A) and the polymer (B). Also, because both the resin (A) and polymer (B) are reactive with each other, the extraction of the reactive resin (A) and reactive polymer (B) after cure is minimized or eliminated.

In prior art applications glassfins are typically bonded to the face glass along the height (long dimension) with a black structural sealant whilst the top and bottom of the glassfin is mechanically fixed in a U channel profile such that the joint is only subjected to dynamic wind loading and no deadload making it an ideal application where hot-melt technology could bring a clear aesthetic advantage. Glassfin dimensions of 30 mm thickness are typical. In order to respect the ratio between width and thickness of the joint, a thickness of 10 mm of adhesive would typically be applied. An example of the transparent nature of the hot melt adhesive used can be seen in FIG. 1.

The invention claimed is:

1. A structural glazing assembly comprising:
   a frame;
   a transparent panel; and
   a transparent spacer material located between the frame and transparent panel;
   wherein the frame and transparent panel are adhered to each other by a layer of a transparent silicone elastomer located there between; and
   wherein the transparent silicone elastomer is the cured elastomeric product of a moisture-curable hot melt silicone adhesive composition comprising:
   (A) a reactive resin comprising the reaction product of a reaction of:
      (i) an alkenyl-functional siloxane resin comprising $R_3SiO_{1/2}$ units and $SiO_{4/2}$ units wherein each R is independently a monovalent hydrocarbon radical having 1 to 6 carbon atoms with the proviso that at least one R is an alkenyl radical, wherein the molar ratio of the $R_3SiO_{1/2}$ units to $SiO_{4/2}$ units has a value of from 0.5/1 to 1.5/1,
      (ii) an alkoxysilane-functional organosiloxane compound having at least one silicon-bonded hydrogen atom, and optionally
      (iii) an endcapper, and optionally
      (iv) an alkenyltrialkoxysilane, in the presence of
      (v) a hydrosilylation catalyst;
   (B) a reactive polymer comprising the reaction product of a reaction of:
      (vi) an alkoxysilane-functional organosiloxane compound having at least one silicon-bonded hydrogen atom, and
      (vii) a polyorganosiloxane having an average, per molecule, of at least two aliphatically unsaturated organic groups, and optionally
      (viii) an alkenyltrialkoxysilane, in the presence of
      (ix) a hydrosilylation catalyst;
   (C) a moisture cure catalyst; and
   (D) a crosslinker.

2. The structural glazing assembly in accordance with claim 1, wherein the transparent spacer material is selected from the group consisting of glass, clear butyl, a hydrosilylation cured silicone rubber elastomer, a peroxide cured silicone rubber elastomer, polymethyl methacrylate (PMMA), polycarbonate, and extruded transparent polyisobutylene (PIB).

3. A method of preparing a structural glazing assembly, the method comprising:
   providing a frame/support having a first major surface;
   applying a transparent silicone adhesive composition onto the first major surface of the frame/support;
   positioning a transparent panel on the transparent silicone adhesive composition; and
   curing the transparent silicone adhesive composition to bond the transparent panel to the first major surface of the frame/support;
   wherein the transparent silicone adhesive composition is a moisture-curable hot melt silicone adhesive composition comprising:
   (A) a reactive resin comprising the reaction product of a reaction of:
      (i) an alkenyl-functional siloxane resin comprising $R_3SiO_{1/2}$ units and $SiO_{4/2}$ units wherein each R is independently a monovalent hydrocarbon radical having 1 to 6 carbon atoms with the proviso that at least one R is an alkenyl radical, wherein the molar ratio of the $R_3SiO_{1/2}$ units to $SiO_{4/2}$ units has a value of from 0.5/1 to 1.5/1,
      (ii) an alkoxysilane-functional organosiloxane compound having at least one silicon-bonded hydrogen atom, and optionally
      (iii) an endcapper, and optionally
      (iv) an alkenyltrialkoxysilane, in the presence of
      (v) a hydrosilylation catalyst;

(B) a reactive polymer comprising the reaction product of a reaction of:
  (vi) an alkoxysilane-functional organosiloxane compound having at least one silicon-bonded hydrogen atom, and
  (vii) a polyorganosiloxane having an average, per molecule, of at least two aliphatically unsaturated organic groups, and optionally
  (viii) an alkenyltrialkoxysilane, in the presence of
  (ix) a hydrosilylation catalyst;
(C) a moisture cure catalyst; and
(D) a crosslinker.

4. The method in accordance with claim 3, wherein a transparent spacer is utilised to separate the first major surface of the frame/support and the transparent panel.

5. A method of preparing a structural glazing assembly, the method comprising:
  providing a frame/support having a first major surface;
  applying a transparent spacer onto the first major surface of the frame/support;
  positioning a transparent panel on the transparent spacer;
  filling a cavity with transparent silicone adhesive composition, the cavity defined by the first major surface of the frame/support, the transparent spacer and the transparent panel; and
  curing the transparent silicone adhesive composition to bond the transparent panel to the first major surface of the frame/support;
  wherein the transparent silicone adhesive composition is a moisture-curable hot melt silicone adhesive composition comprising:
(A) a reactive resin comprising the reaction product of a reaction of:
  (i) an alkenyl-functional siloxane resin comprising $R_3SiO_{1/2}$ units and $SiO_{4/2}$ units wherein each R is independently a monovalent hydrocarbon radical having 1 to 6 carbon atoms with the proviso that at least one R is an alkenyl radical, wherein the molar ratio of the $R_3SiO_{1/2}$ units to $SiO_{4/2}$ units has a value of from 0.5/1 to 1.5/1,
  (ii) an alkoxysilane-functional organosiloxane compound having at least one silicon-bonded hydrogen atom, and optionally
  (iii) an endcapper, and optionally
  (iv) an alkenyltrialkoxysilane, in the presence of
  (v) a hydrosilylation catalyst;
(B) a reactive polymer comprising the reaction product of a reaction of:
  (vi) an alkoxysilane-functional organosiloxane compound having at least one silicon-bonded hydrogen atom, and
  (vii) a polyorganosiloxane having an average, per molecule, of at least two aliphatically unsaturated organic groups, and optionally
  (viii) an alkenyltrialkoxysilane, in the presence of
  (ix) a hydrosilylation catalyst;
(C) a moisture cure catalyst; and
(D) a crosslinker.

6. The structural glazing assembly in accordance with claim 1, wherein the transparent panel is a glass pane.

7. The structural glazing assembly in accordance with claim 6, wherein the frame is a metal frame.

8. The structural glazing assembly in accordance with claim 1, wherein the transparent spacer is adhered directly to the surface of the transparent panel.

9. The method in accordance with claim 3, wherein the transparent panel is a glass pane and the frame/support is a metal frame/support.

10. The method in accordance with claim 5, wherein the transparent panel is a glass pane and the frame/support is a metal frame/support.

11. The structural glazing assembly in accordance with claim 1, wherein the endcapper (iii) is utilized to form the reaction product of the reactive resin (A).

12. The structural glazing assembly in accordance with claim 1, wherein the alkenyltrialkoxysilane (iv) is utilized to form the reaction product of the reactive resin (A).

13. The structural glazing assembly in accordance with claim 1, wherein the alkenyltrialkoxysilane (viii) is utilized to form the reaction product of the reactive polymer (B).

* * * * *